(12) United States Patent
Cheng

(10) Patent No.: US 9,439,517 B2
(45) Date of Patent: Sep. 13, 2016

(54) BELT STRAP OF HIGH CHAIR FOR DINING

(71) Applicant: JIN SUN GEE PLASTICS CO., LTD., Tainan (TW)

(72) Inventor: Chung-Jen Cheng, Tainan (TW)

(73) Assignee: Jin Sun Gee Plastics Co., Ltd., Tainan (TW)

(*) Notice: Subject to any disclaimer, the term of this patent is extended or adjusted under 35 U.S.C. 154(b) by 277 days.

(21) Appl. No.: 14/466,148

(22) Filed: Aug. 22, 2014

(65) Prior Publication Data

US 2016/0051063 A1 Feb. 25, 2016

(51) Int. Cl.
| | |
|---|---|
| *A47D 1/08* | (2006.01) |
| *A47D 1/10* | (2006.01) |
| *A47D 15/00* | (2006.01) |
| *B60N 2/28* | (2006.01) |
| *A47D 1/00* | (2006.01) |

(52) U.S. Cl.
CPC ............. *A47D 15/006* (2013.01); *A47D 1/002* (2013.01); *A47D 1/103* (2013.01); *B60N 2/286* (2013.01); *B60N 2/2821* (2013.01)

(58) Field of Classification Search
CPC .... B60N 2/2821; B60N 2/286; A47D 1/103; A47D 1/008; A47D 1/002
USPC ........ 297/227, 276, 280, 281, 411.2, 188.16, 297/188.03, 256.16, 256.13, 148–155, 464, 297/467, 485
See application file for complete search history.

(56) References Cited

U.S. PATENT DOCUMENTS

| | | | | |
|---|---|---|---|---|
| 6,773,064 B2* | 8/2004 | Treen | ...................... | A47D 1/002 297/153 |
| 7,104,603 B2* | 9/2006 | Keegan | .................. | A47D 1/004 297/151 |
| 7,497,753 B1* | 3/2009 | Filgueiras | ................ | B60N 2/28 297/184.13 |
| 8,091,965 B2* | 1/2012 | Flannery | ................ | A47D 1/103 297/250.1 |
| 2004/0021353 A1* | 2/2004 | Lozano | .................. | A45C 13/00 297/255 |

FOREIGN PATENT DOCUMENTS

TW     M476534 U     4/2014

* cited by examiner

*Primary Examiner* — Syed A Islam
(74) *Attorney, Agent, or Firm* — Rosenberg, Klein & Lee

(57) ABSTRACT

This invention relates to a belt strap of high chair for dining, wherein each of two armrests provided on both sides of a chair seat has an accommodation space. A first strap and a second strap are respectively provided in the accommodation spaces of the armrests and are covered by upper lids respectively. The first strap and the second strap are pulled out from through-slot holes opening to outside of the accommodation spaces respectively. A first end of the first strap is combined securely with a first end of the second strap, and a second end of the first strap is combined securely with a second end of the second strap so that the first strap and the second strap are connected integrally with each other.

4 Claims, 7 Drawing Sheets

BELT STRAP OF HIGH CHAIR FOR DINING

BACKGROUND OF THE INVENTION

1. Field of the Invention

This invention relates to a belt strap structure of high chair for dining, more particularly to a belt strap structure of high chair which enables easier length adjustment of straps in operation, and easy storage of straps in non-use condition of the high chair so as to avoid pollution of the straps.

2. Brief Description of the Prior Art

High chair is a chair usually for feeding older babies and younger toddlers. The high chair is raised to a certain height from the ground, so that the overall height with child seating thereon is close to that of an adult. Hence, an adult may feed the child conveniently on one hand, and a safe riding space is provided for the child on the other hand. In order that the high chair can be used in diverse condition, the concerned industry has developed a structure with a detachable chair seat and chair legs, so that the chair seat after detachment can be disposed on the other chair means.

In order that the chair seat after detachment from the chair legs can be combined firmly on the other chair means, strap means is usually provided on the chair seat for fixing the chair seat firmly on the chair means. Referring to a Taiwanese Patent Gazette No. M476534 entitled "Portable Inflatable Dining Chair Cushion for Child" publicized on Apr. 21, 2014, the chair cushion comprises: a first cushion body formed by an inflatable and deflatable air bag structure, which has first straps provided on both sides thereof, the ends of these two first straps can be connected relative to each other so as to be tightened firmly on the back of a chair; a second cushion body connected to one end of the first cushion body formed by an inflatable and deflatable air bag structure, which has second straps provided on both sides thereof, the ends of these two second straps can be connected relative to each other so as to be tightened firmly on the chair seat of the chair, the second cushion body also has a gird for tightening thighs of the child.

The above portable type inflatable dining chair cushion for child can achieve predetermined function of tightening the chair cushion firmly on the chair by the first straps and the second straps, however the above structure has the following defects found in its practical implementation:

A). As there are different sizes of various chairs, the lengths of the first straps and the second straps have to be adjusted according to the dimension of the chair, and this will cause great inconvenience in use. Especially, in the length adjustment of the second straps tightened below the chair seat of the chair, users often feel cumbersome to squat their bodies or to stoop so as to carry out the length adjustment.

B). The first straps and the second straps, when in non-use state, have no storage means, and this may results in whatever hang-down of the first straps and the second straps, not only causing great inconvenience of storage but also likely to be contaminated with dirt.

In view of the above reasons, the inventor of the present invention proposes a novel belt strap structure of high chair for dining according to the improvement conducted on the conventional structure with respect to its defects, and based on his abundant experience of R&D and manufacturing in relevant field, so as to achieve the purpose of better implementation value.

SUMMARY OF THE INVENTION

The main object of this invention is to provide a belt strap structure of high chair for dining, which is mainly to connect a first strap and a second strap of a chair seat integrally with each other, when the chair seat is disposed on the other chair means. Thus, when anyone of the straps is pulled to move, the other strap will also move concurrently. By the length adjustment of anyone of the straps, the first strap and the second strap can be tightened firmly on the chair means, so that it becomes very convenient in both operation and implementation. In addition, the first strap and the second strap can be stored in accommodation spaces of the armrests respectively and are covered by upper lids. Not only the storage of the straps is easy but also the case of straps contamination due to arbitrarily hang-down is prevented from happening.

The main object and effect of the belt strap of high chair for dining of the present invention can be achieved by the following specific technical means.

A belt strap of high chair for dining of the present invention is provided, wherein armrests are respectively provided on both sides of the chair seat, each of the armrests has an accommodation space provided therein, and through-slot holes opening to outside are provided on the accommodation space respectively. A first strap and a second strap are respectively provided in the accommodation spaces of the armrests. Each armrest has an upper lid provided correspondingly to the accommodation space. The first strap and the second strap can be pulled out through the through-slot holes of the accommodation spaces respectively. A first end of the first strap is combined securely with a first end of the second strap, and a second end of the first strap is combined securely with a second end of the second strap, so that the first strap and the second strap can be connected integrally with each other.

According to a preferred embodiment of the belt strap of high chair for dining of the present invention, the first strap has a male buckle and a female buckle respectively provided at the first end and the second end thereof, while the second strap has a female buckle and a male buckle respectively provided on the first end and the second end thereof correspondingly.

According to a preferred embodiment of the belt strap of high chair for dining of the present invention, one end of each of the upper lids has slots on both sides to be pivotally connected with a shaft pin of the armrest. The other end of each of the upper lids is formed with a detention bump, and a detention groove corresponding to the detention bump is provided on each of the armrests.

According to a preferred embodiment of the belt strap of high chair for dining of the present invention, the chair seat is removably disposed on the chair legs in such a manner that the chair seat can be disassembled from the chair legs.

DETAILED DESCRIPTION OF PREFERRED EMBODIMENTS

The objects, the technical contents and the expected effectiveness of the present invention will become more apparent from the detailed description of the preferred embodiment in conjunction with the accompanying drawings.

Figure 1:
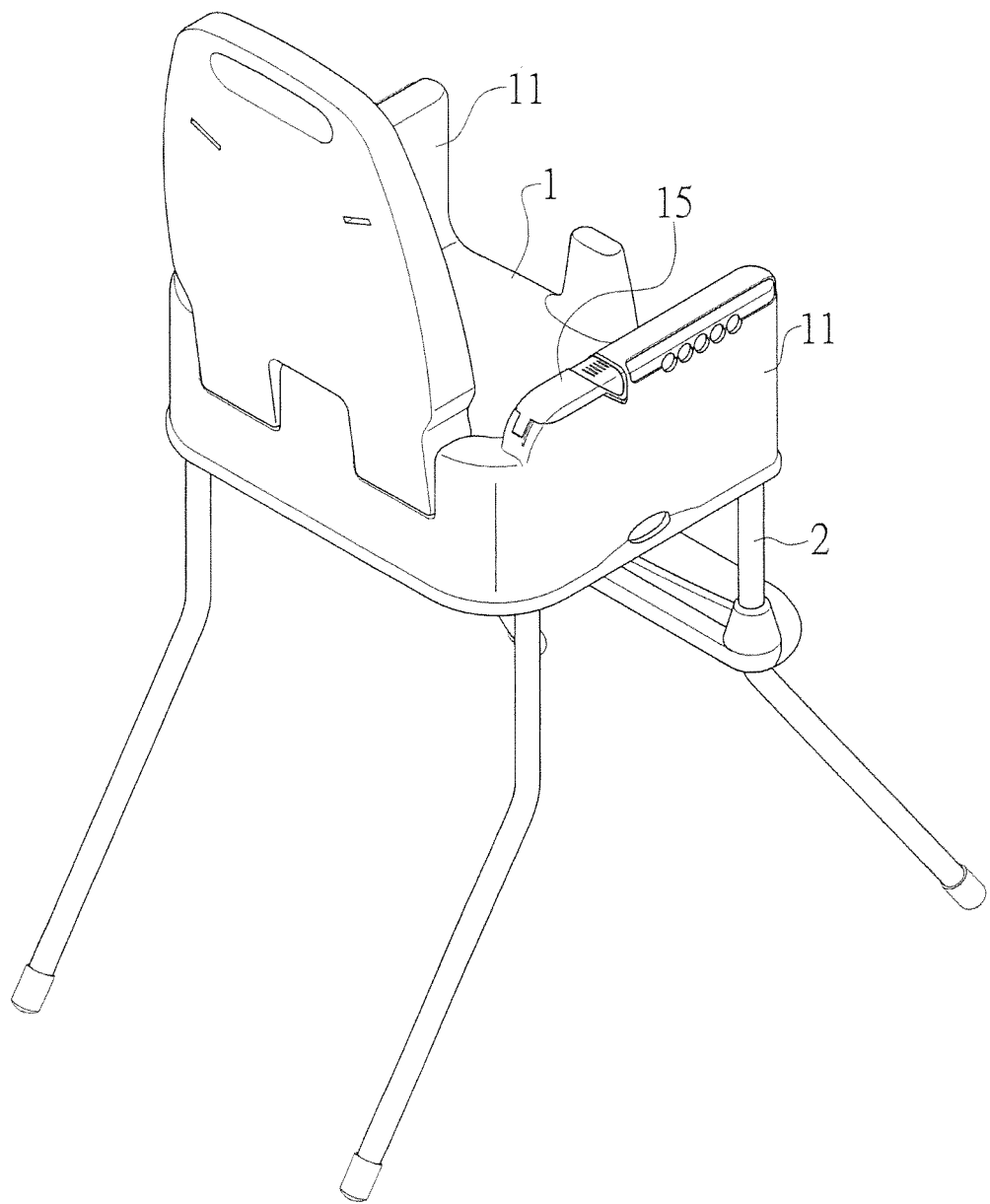
FIG. 1 is a perspective schematic view of overall structure of the present invention.
Figure 2:
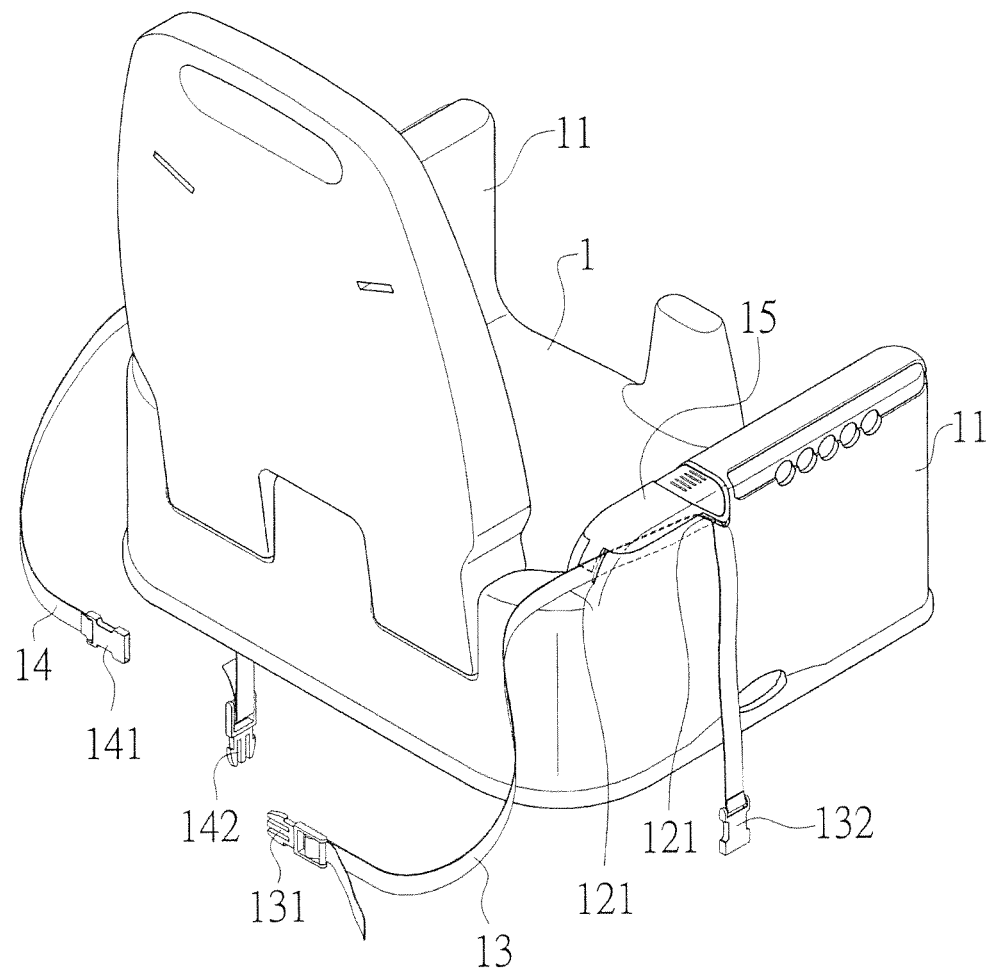
FIG. 2 is a perspective schematic view of the chair seat of the present invention.
Figure 3:
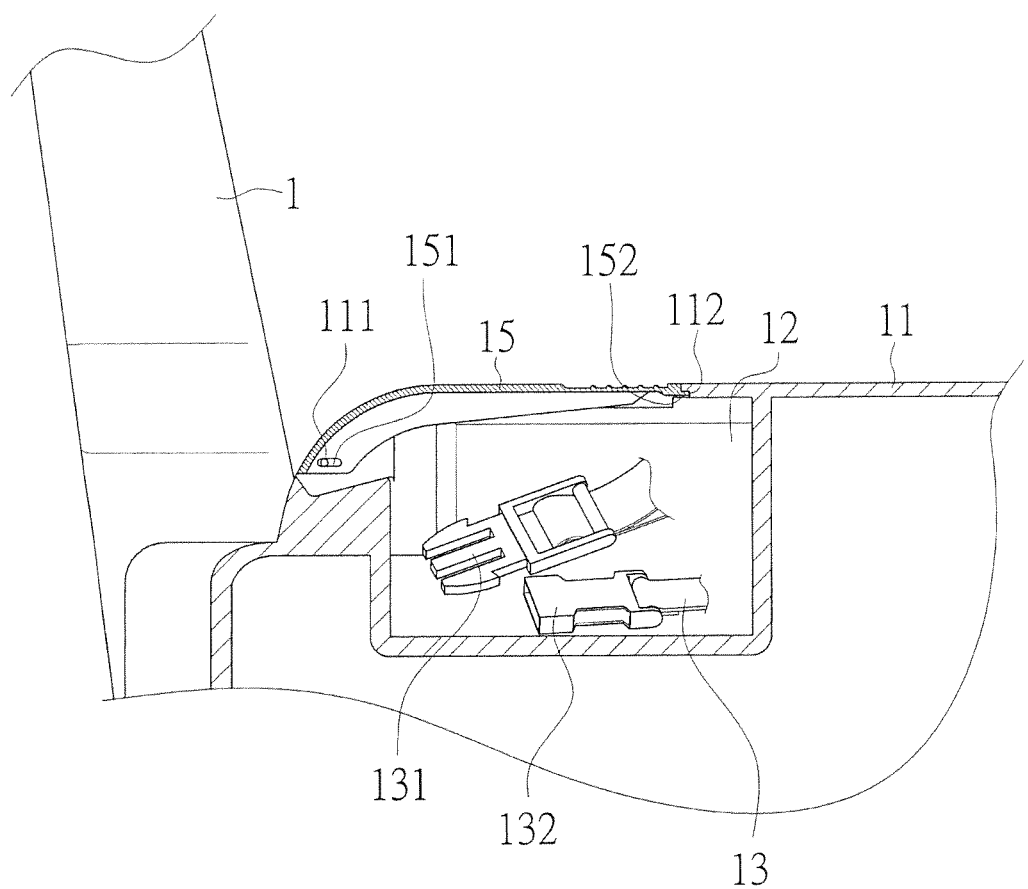
FIG. 3 is a schematic sectional side view showing the structure of the chair seat of the present invention.

Firstly, referring to FIGS. 1 to 3, the high chair of the present invention comprises a chair seat (1) and chair legs (2), and the chair seat (1) is detachable from the chair legs (2).

The chair seat (1) has armrests (11) provided on both sides thereof, and each of the armrests (11) has an accommodation space (12) provided therein, and through-slot holes (121) opening to outside are provided on the accommodation spaces (12) respectively. A first strap (13) and a second strap (14) are respectively provided in the accommodation spaces (12) of the armrests (11), and the first strap (13) and the second strap (14) are able to be pulled out through the through-slot holes (121) of the accommodation spaces (12). The first strap (13) has a male buckle (131) and a female buckle (132) respectively provided at a first end and a second end thereof, while the second strap (14) has a female buckle (141) and a male buckle (142) respectively provided on a first end and a second end thereof correspondingly. In addition, each of the armrests (11) has an upper lid (15) provided correspondingly to the accommodation space (12). One end of each of the upper lids (15) has slots (151) on both sides which are pivotally connected with a shaft pin (111) of the armrest (11). The other end of each of the upper lids (15) is formed with a detention bump (152), and a detention groove (112) corresponding to the detention bump (152) of the upper lid (15) is provided on each of the armrests (11).

Figure 4:
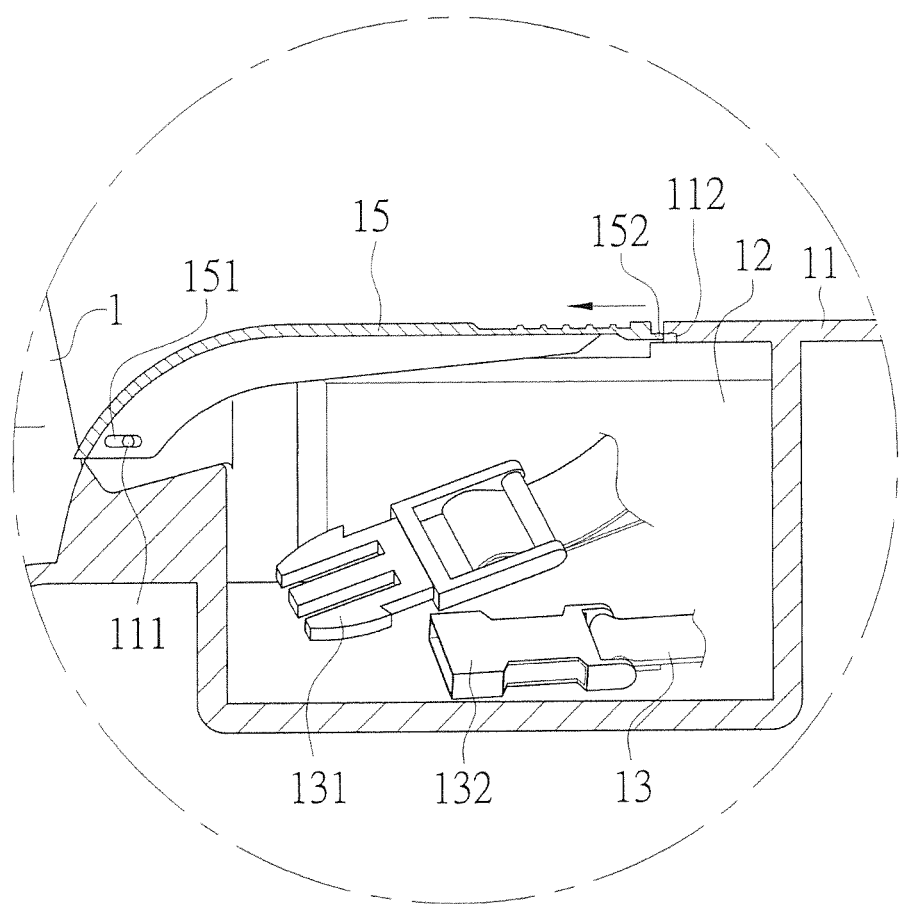
FIG. 4 is a schematic sectional side view showing the action of the upper lid of the present invention detaching from the state of engagement.
Figure 5:
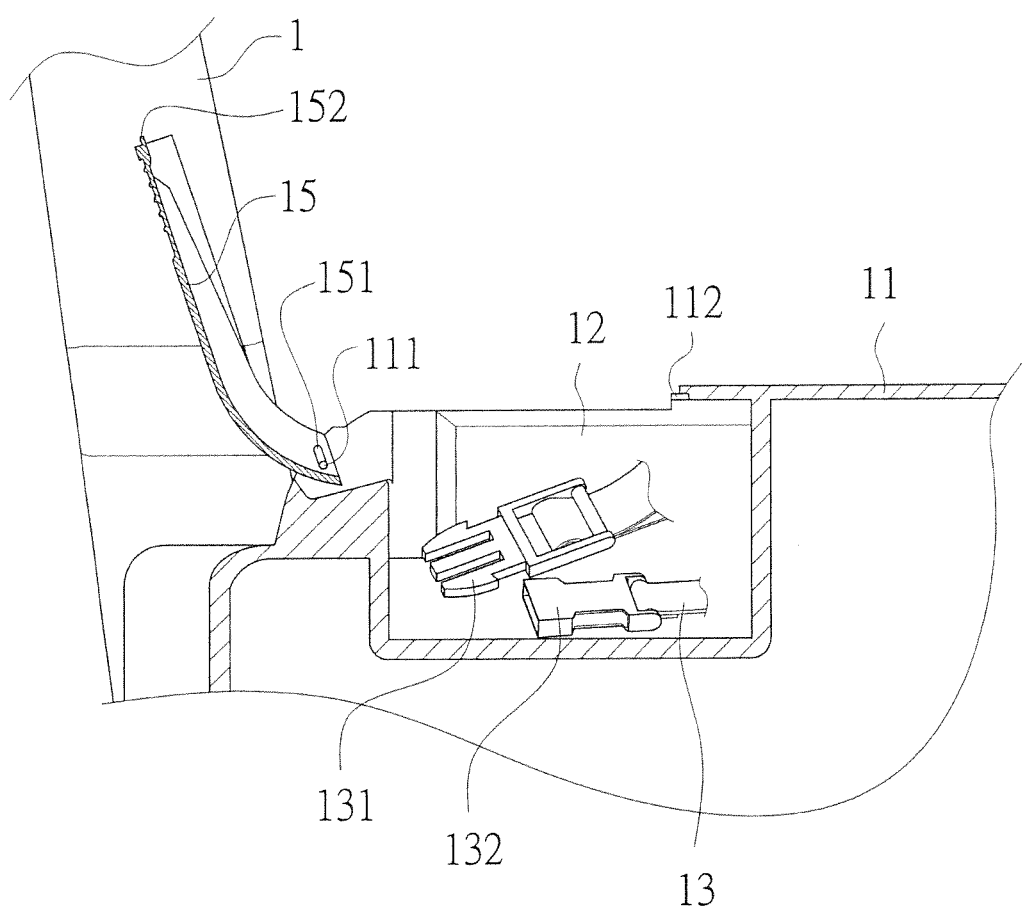
FIG. 5 is a schematic sectional side view showing the action of the upper lid of the present invention in open state.
Figure 6:
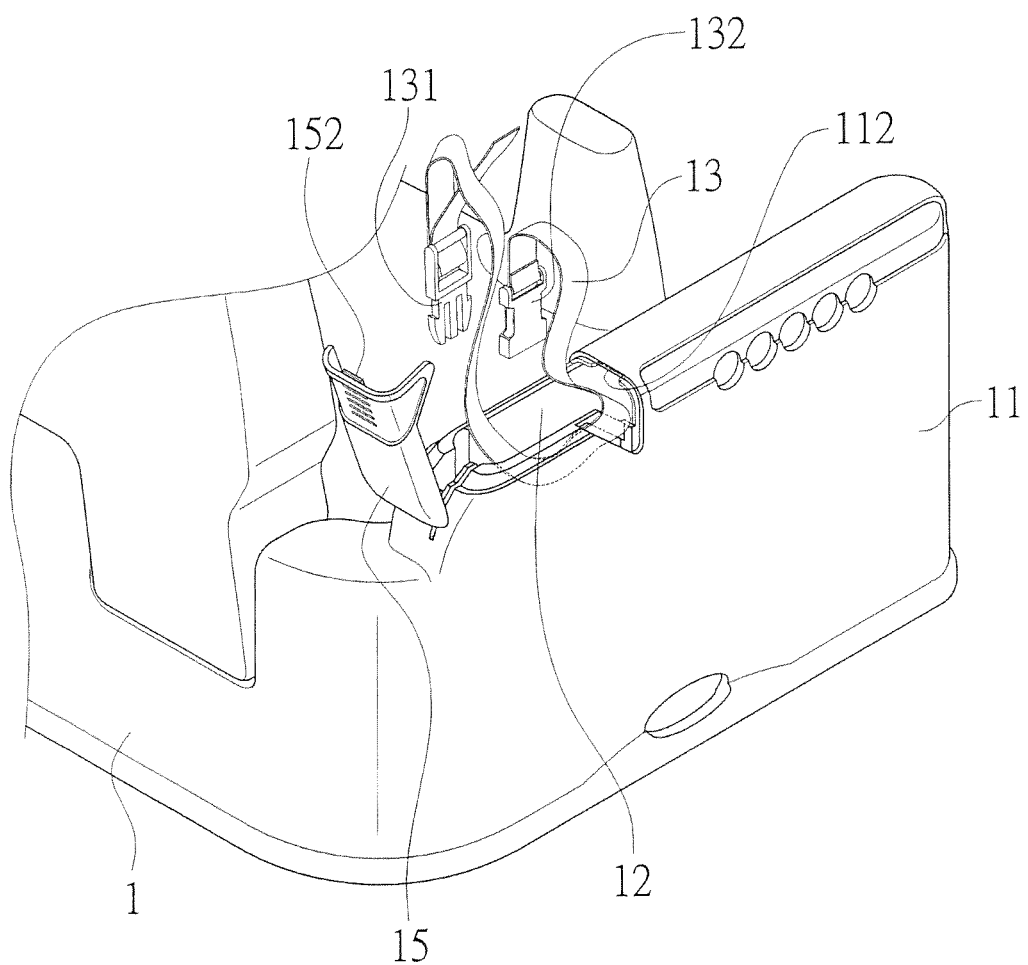
FIG. 6 is a schematic sectional side view showing the action of the belt straps of the present invention are pulled out.
Figure 7:
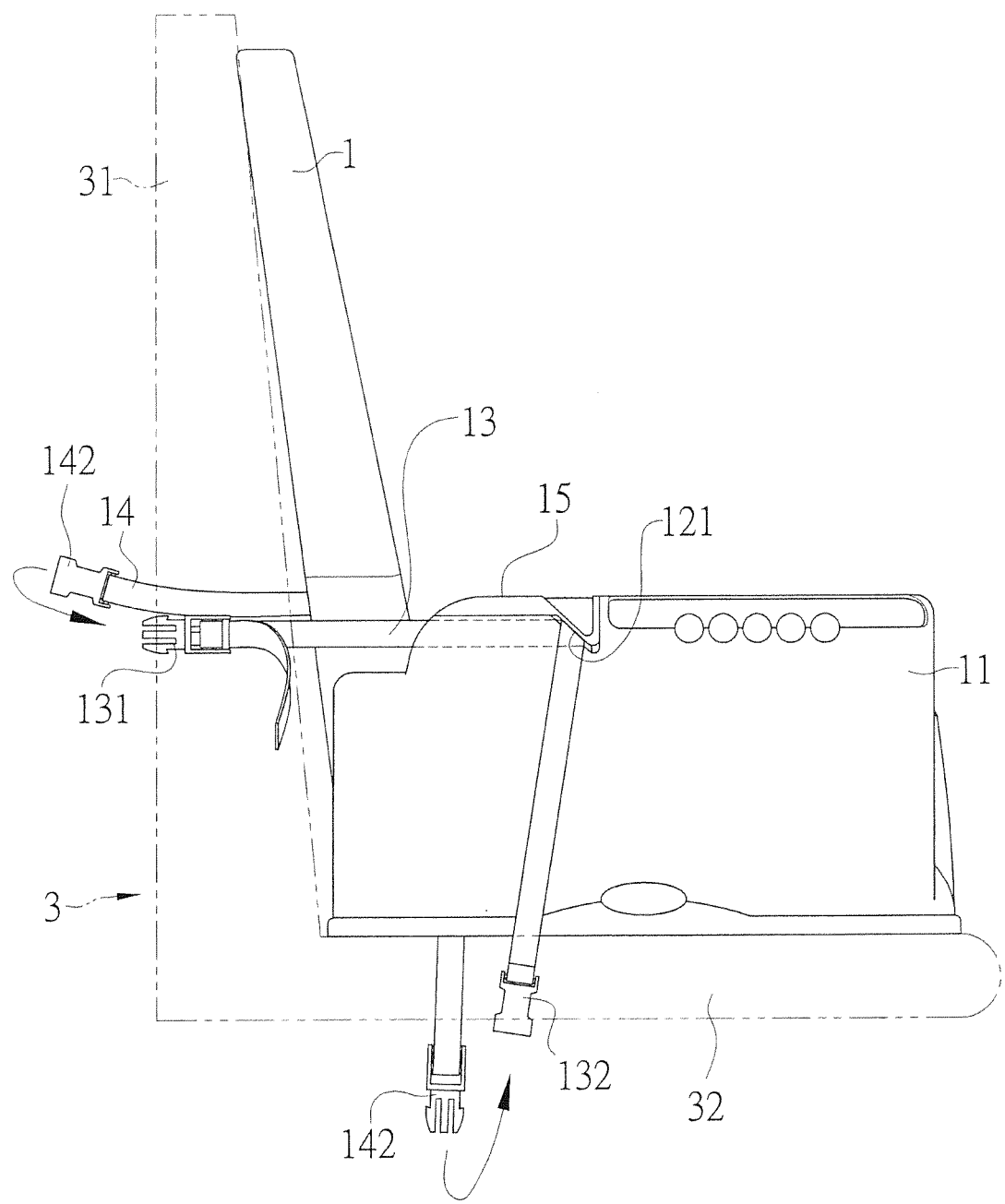
FIG. 7 is a schematic view of the belt straps of the present invention in use state.

Configuring like this, the first strap (13) and the second strap (14) can be stored within the accommodation spaces respectively, when not in use. If the chair seat (1) is detached from the chair legs (2) and is disposed on the other chair means (3) instead, each of the upper lids (15) is moved backward on the armrest (11) of the chair seat (1) so that the detention bump (152) is disengaged from the detention groove (112) of the armrest (11), as shown in FIG. 4. Therefore, the upper lids (15) can be lifted to open, as shown in FIG. 5, so that the first strap (13) and the second strap (14) can be pulled out of the accommodation spaces (12) respectively, as shown in FIG. 6. Then, the upper lids (15) are closed over the accommodation spaces (12) and are moved forward so that the detention bump (152) of the upper lids (15) can be fitted in the detention grooves (112) of the armrests (11); the first strap (13) and the second strap (14) are moved out from the through-slot holes (121) of the accommodation spaces (12) respectively. Next, the male buckle (131) provided on the first end of the first strap (13) is engaged with the female buckle (141) provided on the first end of the second strap (14), so as to be fastened behind a chair back (31) of the chair means (3), and the female buckle (132) provided on the second end of the first strap (13) is engaged with the male buckle (142) provided on the second end of the second strap (14), so as to be fastened below a chair seat (32) of the chair means (3), as shown in FIG. 7. In this manner, the first strap (13) and the second strap (14) are integrally connected with each other, and the first strap (13) and the second strap (14) are movably disposed through the through-slot holes (121) of the accommodation spaces (12). If anyone strap is pulled to move, the other strap is moved together so that length adjustment of anyone strap can allow the first strap (13) and the second strap (14) to be tightened firmly on the chair means (3) completely.

Summing up above, it is apparent from the description of constituents and implementation of the present invention that the present invention has the following advantages, comparing with that of the conventional art.

1. When the chair seat is disposed on the other chair means, the first strap and the second strap can be integrally connected with each other. When anyone strap is pulled to move, the other strap is also moved concurrently. Therefore, length adjustment of anyone strap can allow the first strap and the second strap to be tightened firmly on the chair means completely, making it more simple and convenient in operation.

2. The first strap and the second strap can be stored respectively in the accommodation spaces of the armrests and are covered by the upper lids, when not in use. Not only the storage of the straps is easy but also the case of straps contamination due to arbitrarily hang-down is prevented from happening.

What is claimed is:

1. A belt strap of high chair for dining, wherein, armrests are respectively provided on both sides of a chair seat, each of the armrests has an accommodation space provided therein and each of the accommodation spaces has a through-slot hole opening to outside; a first strap and a second strap are respectively provided in the accommodation spaces of the armrests on both sides; each armrest has an upper lid provided correspondingly to the accommodation space; the first strap and the second strap are pulled out from the through-slot holes of the accommodation spaces respectively; a first end of the first strap is combined securely with a first end of the second strap, and a second end of the first strap is combined securely with a second end of the second strap, so that the first strap and the second strap are connected integrally with each other.

2. The belt strap of high chair for dining as claimed in claim 1, wherein the first strap has a male buckle and a female buckle respectively provided at the first end and the second end thereof, while the second strap has a female buckle and a male buckle respectively provided on the first end and the second end thereof correspondingly.

3. The belt strap of high chair for dining as claimed in claim 1, wherein one end of each of the upper lids has slots on both sides to be pivotally connected with a shaft pin on the armrest; the other end of each of the upper lids is formed with a detention bump, and a detention groove corresponding to the detention bump is provided on each of the armrests.

4. The belt strap of high chair for dining as claimed in claim 1, wherein the chair seat is removably disposed on chair legs in such a manner that the chair seat can be disassembled from the chair legs.

* * * * *